US009021888B2

(12) United States Patent
Takuma et al.

(10) Patent No.: US 9,021,888 B2
(45) Date of Patent: May 5, 2015

(54) LOAD DETECTION DEVICE FOR VEHICLE SEAT

(71) Applicants: Aisin Seiki Kabushiki Kaisha, Kariya-shi (JP); Honda Motor Co., Ltd., Minato-ku (JP)

(72) Inventors: Setsu Takuma, Gamagori (JP); Kan Ichihara, Kariya (JP); Koichi Nakayama, Ama (JP); Koji Washino, Anjo (JP); Harutomi Nishide, Wako (JP)

(73) Assignees: Aisin Seiki Kabushiki Kaisha, Kariya-shi (JP); Honda Motor Co., Ltd., Minato-ku (JP)

( * ) Notice: Subject to any disclaimer, the term of this patent is extended or adjusted under 35 U.S.C. 154(b) by 0 days.

(21) Appl. No.: 13/665,079

(22) Filed: Oct. 31, 2012

(65) Prior Publication Data

US 2013/0104666 A1 May 2, 2013

(30) Foreign Application Priority Data

Oct. 31, 2011 (JP) ................................. 2011-238716

(51) Int. Cl.
*G01L 1/00* (2006.01)
*G01G 19/414* (2006.01)
*G01L 1/22* (2006.01)

(52) U.S. Cl.
CPC .......... *G01G 19/4142* (2013.01); *G01L 1/2206* (2013.01)

(58) Field of Classification Search
USPC .......................................................... 73/855
See application file for complete search history.

(56) References Cited

U.S. PATENT DOCUMENTS

| 3,487,680 A * | 1/1970 | Illg et al. .......................... 73/788 |
| 4,266,430 A * | 5/1981 | Glassey .......................... 73/701 |
| 6,700,195 B1 * | 3/2004 | Mandel .......................... 257/718 |

(Continued)

FOREIGN PATENT DOCUMENTS

| CN | 1362922 A | 8/2002 |
| CN | 1926411 A | 3/2007 |

(Continued)

OTHER PUBLICATIONS

English Machine Translation of JP 2009128106 A, Ito et al., Nov. 6, 2009.*
Office Action issued Jan. 21, 2014 in Japanese Patent Application No. 2011-238716 (with English language translation).
Wang Ping et al; "Vibration Measurement and Evaluation of Riding Comfort for J-50 Tractor"; Journal of Northeast Forestry University; vol. 20, No. 6; Nov. 1992; pp. 76-82.
Office Action issued Feb. 13, 2015 in Chinese Patent Application No. 201210425805.1.

*Primary Examiner* — Lisa Caputo
*Assistant Examiner* — Philip Cotey
(74) *Attorney, Agent, or Firm* — Oblon, McClelland, Maier & Neustadt, L.L.P.

(57) ABSTRACT

A load detection device for a vehicle seat includes a strain generating body including a first end hole, a second end hole and a strain gauge, a first fixing member including a first middle shaft portion and a first end shaft portion, a second fixing member including a second middle shaft portion and a second end shaft portion, a bracket member including first and second fixing portions connected to each other with a connecting portion, first and second fixing holes, the first end shaft portion is press-fitted into the first fixing hole, the second fixing hole is fitted onto the second end shaft portion in a manner that the second fixing hole includes a degree of freedom of a movement thereof in a lengthwise direction and a movement thereof in a direction intersecting with the lengthwise direction is restricted, and a connecting member.

6 Claims, 6 Drawing Sheets

(56) References Cited

U.S. PATENT DOCUMENTS

| | | | |
|---|---|---|---|
| 7,155,981 B2 | 1/2007 | Matsuura et al. | |
| 7,559,249 B2 * | 7/2009 | Nakano et al. | 73/781 |
| 7,823,459 B2 * | 11/2010 | Ito et al. | 73/781 |
| 2003/0084731 A1 * | 5/2003 | Muraishi | 73/849 |
| 2003/0106723 A1 * | 6/2003 | Thakur et al. | 177/144 |
| 2003/0184817 A1 * | 10/2003 | Hayashi | 358/474 |
| 2004/0231435 A1 * | 11/2004 | Kobata | 73/862.381 |
| 2005/0005981 A1 * | 1/2005 | Eidsmore et al. | 137/884 |
| 2006/0230870 A1 * | 10/2006 | Fukase | 74/512 |
| 2007/0003265 A1 * | 1/2007 | Nomura et al. | 396/55 |
| 2007/0240525 A1 | 10/2007 | Kaijala | |
| 2008/0012197 A1 * | 1/2008 | Sonoda et al. | 271/3.02 |
| 2008/0156103 A1 * | 7/2008 | Nakano et al. | 73/781 |
| 2009/0126500 A1 * | 5/2009 | Ito et al. | 73/781 |
| 2009/0147495 A1 * | 6/2009 | Hetzer et al. | 361/823 |
| 2009/0301226 A1 * | 12/2009 | Hirabayashi et al. | 73/862.626 |
| 2010/0011885 A1 * | 1/2010 | Ohsato et al. | 73/862.627 |
| 2011/0113897 A1 * | 5/2011 | Simons | 73/862.56 |

FOREIGN PATENT DOCUMENTS

| | | |
|---|---|---|
| CN | 100340848 C | 10/2007 |
| CN | 101062672 A | 10/2007 |
| CN | 101140191 A | 3/2008 |
| DE | 10137759 A1 | 2/2003 |
| JP | 2003-83707 | 3/2003 |
| JP | 2006-029932 A | 2/2006 |
| JP | 2007-176628 A | 7/2007 |
| JP | 2008-100568 A | 5/2008 |
| JP | 2009-128106 A | 6/2009 |
| JP | 2009-128107 | 6/2009 |
| WO | 98/25112 | 6/1998 |

* cited by examiner

LOAD DETECTION DEVICE FOR VEHICLE SEAT

CROSS REFERENCE TO RELATED APPLICATIONS

This application is based on and claims priority under 35 U.S.C. §119 to Japanese Patent Application 2011-238716, filed on Oct. 31, 2011, the entire content of which is incorporated herein by reference.

TECHNICAL FIELD

This disclosure generally relates to a load detection device for a vehicle seat.

BACKGROUND DISCUSSION

There exists various known load detection devices for a vehicle seat for detecting a load applied by an occupant, to be adapted to a vehicle having an airbag for protecting an occupant seated on the vehicle seat, in order to appropriately adjust gas generation in response to weight of the occupant and in order not to actuate an airbag in a case where the occupant is a child. For example, disclosed in JP2003-83707A (hereinafter referred to as Patent reference 1) is a strain sensor, in which a bending stress applied to a strain detecting element does not change, thereby enhancing output accuracy.

The known strain sensor disclosed in Patent reference 1 is configured so that inner surfaces of a first upper washer contacting an upper surface of a sensor board and a first lower washer contacting a lower surface of the sensor board are press-fitted into a first cylinder which is press-fitted into a first fixing hole formed at the sensor board, and so that inner surfaces of a second upper washer contacting the upper surface of the sensor board and a second lower washer contacting the lower surface of the sensor board are press-fitted into a second cylinder, which is press-fitted into a second fixing hole formed at the sensor board, and so that inner surfaces of a detector upper washer contacting the upper surface of the sensor board and a detector lower washer contacting the lower surface of the sensor board are press-fitted into a detecting cylinder which is press-fitted into a detecting hole formed at the sensor board.

As the known strain sensor disclosed in Patent reference 1 is configured from the first washer and the second washer, which are separate and independent from each other, two pairs of washers may be press-fitted into the first and second fixing holes of the sensor board via the first and second cylinders, respectively. However, in a case where the first and second washers are integrally connected by means of an connecting portion on which an amplifier is mounted as described in, for example, Patent reference 1, two fixing portions (corresponding to the first and second washers) may not to be press-fitted into the respective holes in the manner disclosed in Patent reference 1 because of, for example, a dimensional difference between the two fixing portions and the fixing holes formed at the sensor board or because of a dimensional error. Further, if the two fixing portions are forced to be press-fitted into the corresponding fixing holes, an internal stress is generated at the sensor board and the load may not be accurately detected.

In such a case, as described in JP2009-128107A (hereinafter referred to as Patent reference 2), any one of the two fixing portions is press-fitted onto to a fixing shaft that is press-fitted into a strain generating body (a sensor substrate), and the other one of the two fixing portions is fitted onto the fixing shaft that is press-fitted in the strain generating body in a manner that a play is provided between the other one of the two fixing portion and the fixing shaft. Thus, the internal stress is restricted from occurring at the strain generating body.

By bringing the other one of the two fixing portions to be fitted onto the strain generating body in a manner that the play is provided therebetween, the internal stress is restricted from occurring at the strain generating body, however, a looseness between the other one of the two fixing portions and the strain generating body in a direction intersecting with a lengthwise direction of the strain generating body is not restricted, which may adversely affect enhancement of detection ability.

According to Patent reference 2, in a case where the load detection device is transported as a unit, a washer is press-fitted onto an end shaft portion of the other one of the fixing portions so that the other one of the fixing portions and the strain generating body are securely joined to each other. Due to the washer added thereto, the number of parts and weight of the load detection device increase. At the same time, an assembling work load increases, which may result in a new problem of a cost increase. Further, due to the washer added, a tightening axial force may become unstable, which may bring reduction in the load detection ability.

A need thus exists for a load detection device for a vehicle seat, which is not susceptible to the drawback mentioned above.

SUMMARY

According to an aspect of this disclosure, a load detection device for a vehicle seat includes a strain generating body including a first end hole at a first end portion of the strain generating body and a second end hole at a second end portion of the strain generating body, and a strain gauge being attached on the strain generating body between the first end hole and the second end hole, a first fixing member including a first middle shaft portion press-fitted into the first end hole and a first end shaft portion protruding from the first middle shaft portion, the first fixing member being configured to be connected to one of a seat-side fixing member fixing the vehicle seat and a floor-side fixing member fixing the seat-side fixing member to a floor of the vehicle, a second fixing member including a second middle shaft portion press-fitted into the second end hole and a second end shaft portion protruding from the second middle shaft portion, the second fixing member being configured to be connected to the one of the seat-side fixing member and the floor-side fixing member, a bracket member including a connecting portion and first and second fixing portions and connected to each other with the connecting portion, the bracket member including a first fixing hole at one of the first and second fixing portions and a second fixing hole at the other one of the first and second fixing portions, the first fixing hole being formed in a manner that the first end shaft portion of the first fixing member is configured to be press-fitted into the first fixing hole, the second fixing hole being formed to be fitted onto the second end shaft portion of the second fixing member in a manner that the second fixing hole includes a degree of freedom of a movement of the second fixing hole relative to the second end shaft portion of the second fixing member in a lengthwise direction of the strain generating body and in a manner that a movement of the second fixing hole relative to the second end shaft portion in a direction intersecting with the lengthwise direction is restricted, and a connecting member integrally connected to a center portion of the strain generating body and connected to the other one of the seat-side fixing member and the floor-side fixing member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
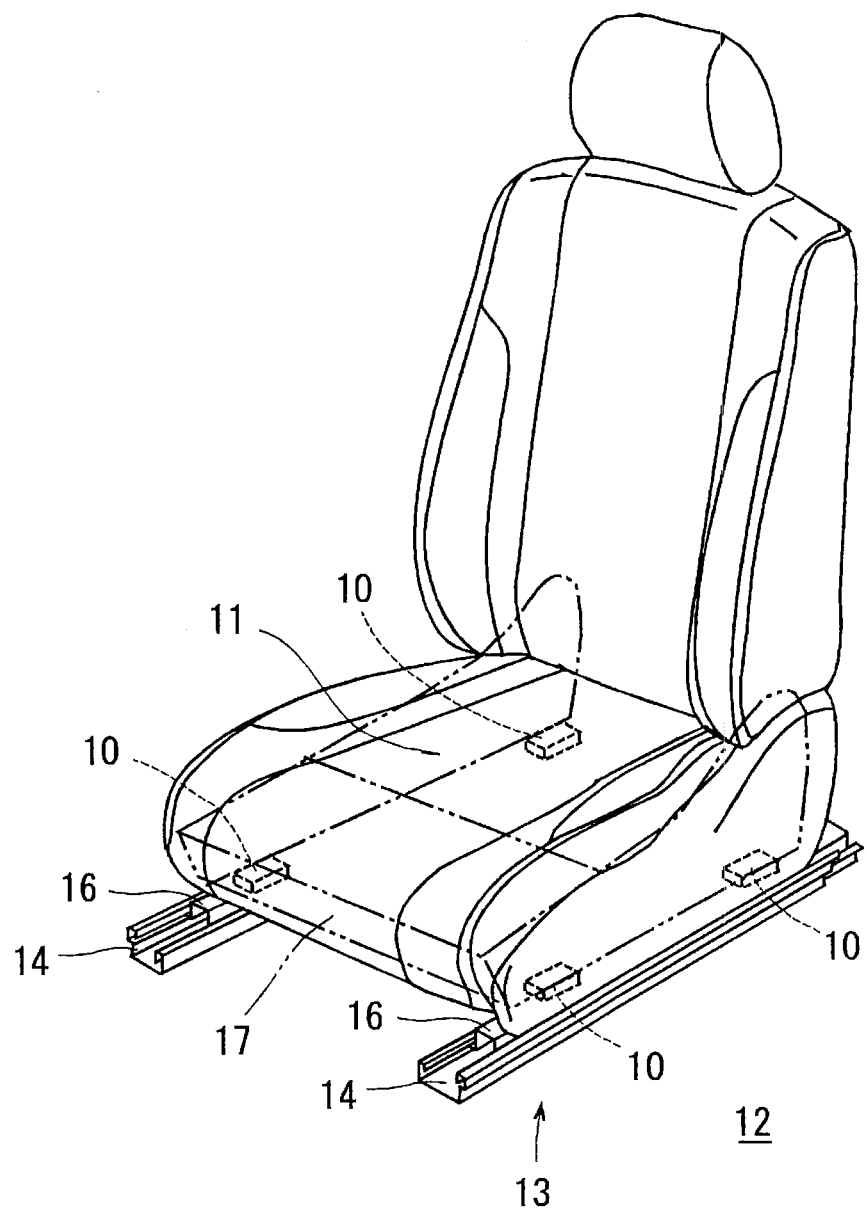
FIG. 1 is a perspective view illustrating a seat for a vehicle having a load detection device according to an embodiment disclosed here.

A load detection device for a vehicle seat according to an embodiment will be described below in accordance with the attached drawings. A load detection device 10 detects (measures) a load applied by an occupant seated on a vehicle seat 11 illustrated in FIG. 1. In FIG. 1, directions "up (upward)", "down (downward)", "left", "right", "front (forward)" and "back (backward)" are determined on the basis of a perspective of the occupant seated on the vehicle seat 11.

Figure 7:
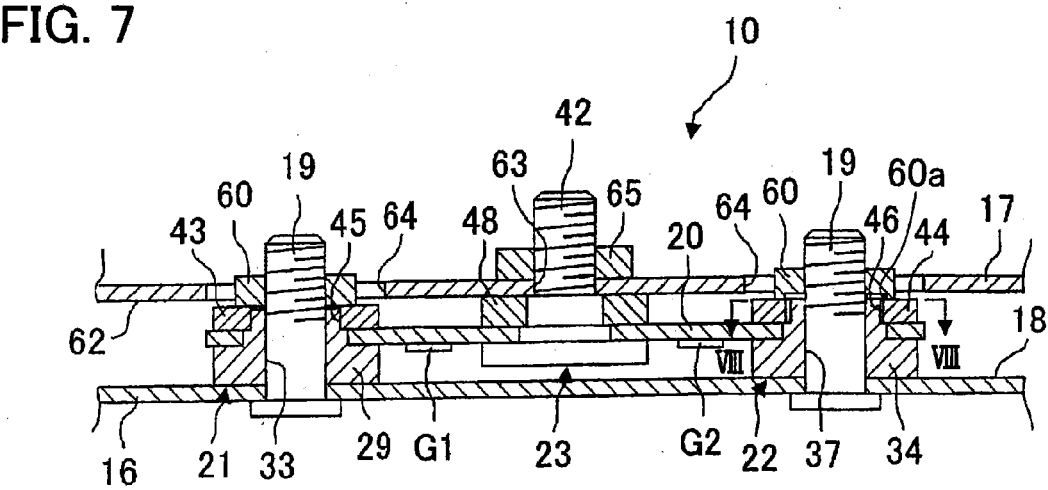
FIG. 7 is a view illustrating a state where the load detection device of the embodiment is assembled on a seat frame.

As illustrated in FIGS. 1 and 7, a seat slide apparatus 13, which fixes the vehicle seat 11 on a floor 12 so that a position of the vehicle seat 11 is adjustable, includes, for example, a pair of lower rails 14 fixed on the floor 12 and extending in a front-rear direction of the vehicle, a pair of upper rails 16 movably supported by the pair of the lower rails 14, respectively.

A seat frame 17, which serves as a seat-side supporting member and supports a seat cushion of the vehicle seat 11, is fixed at attachment surfaces 18 formed on upper surfaces of the pair of the upper rails 16, which serves as a floor-side fixing member, at a lower surface of the seat frame 17, or at four corners of the seat frame 17 in a front-rear direction and a left-right direction thereof at lateral sides, via the load detection devices 10. Further, a pair of fixing shafts 19 for fixing the load detection device 10 at the attachment surface 18 of each upper rail 16 is fixed at each end portion of each of the pair of upper rails 16 so as to extend in a vertical direction and so that the one of the pair of fixing shafts 19 is spaced away from the other one of the pair of fixing shafts 19 for a predetermined distance in the front-rear direction of the vehicle.

Figure 2:
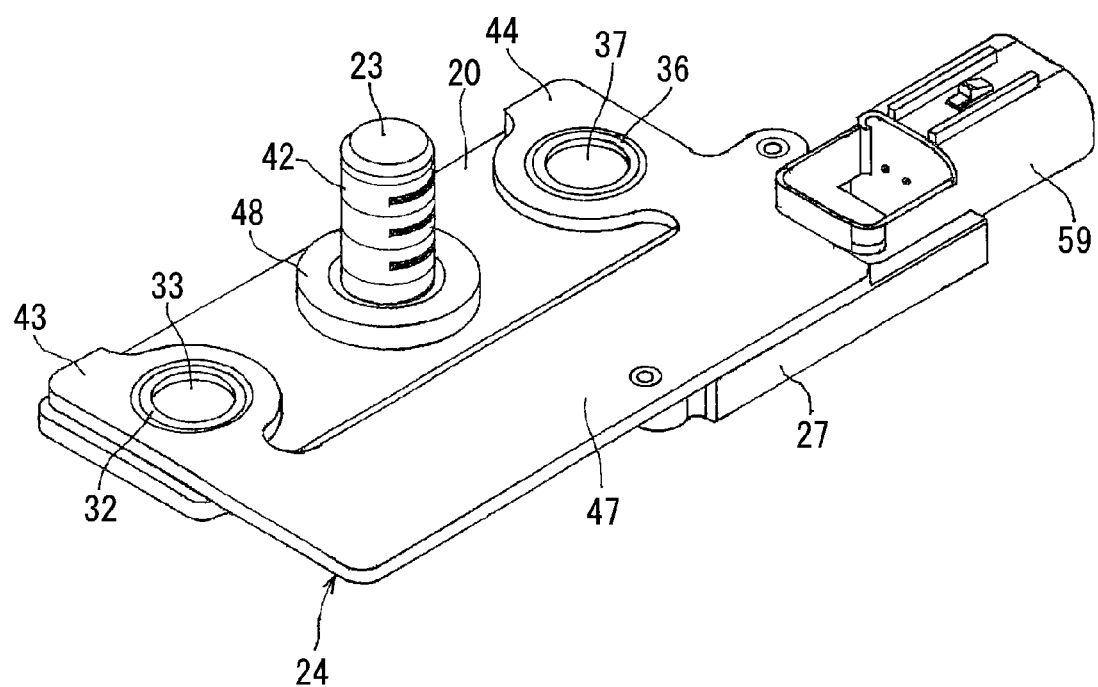
FIG. 2 is a perspective view of the load detection device of the embodiment.
Figure 3:
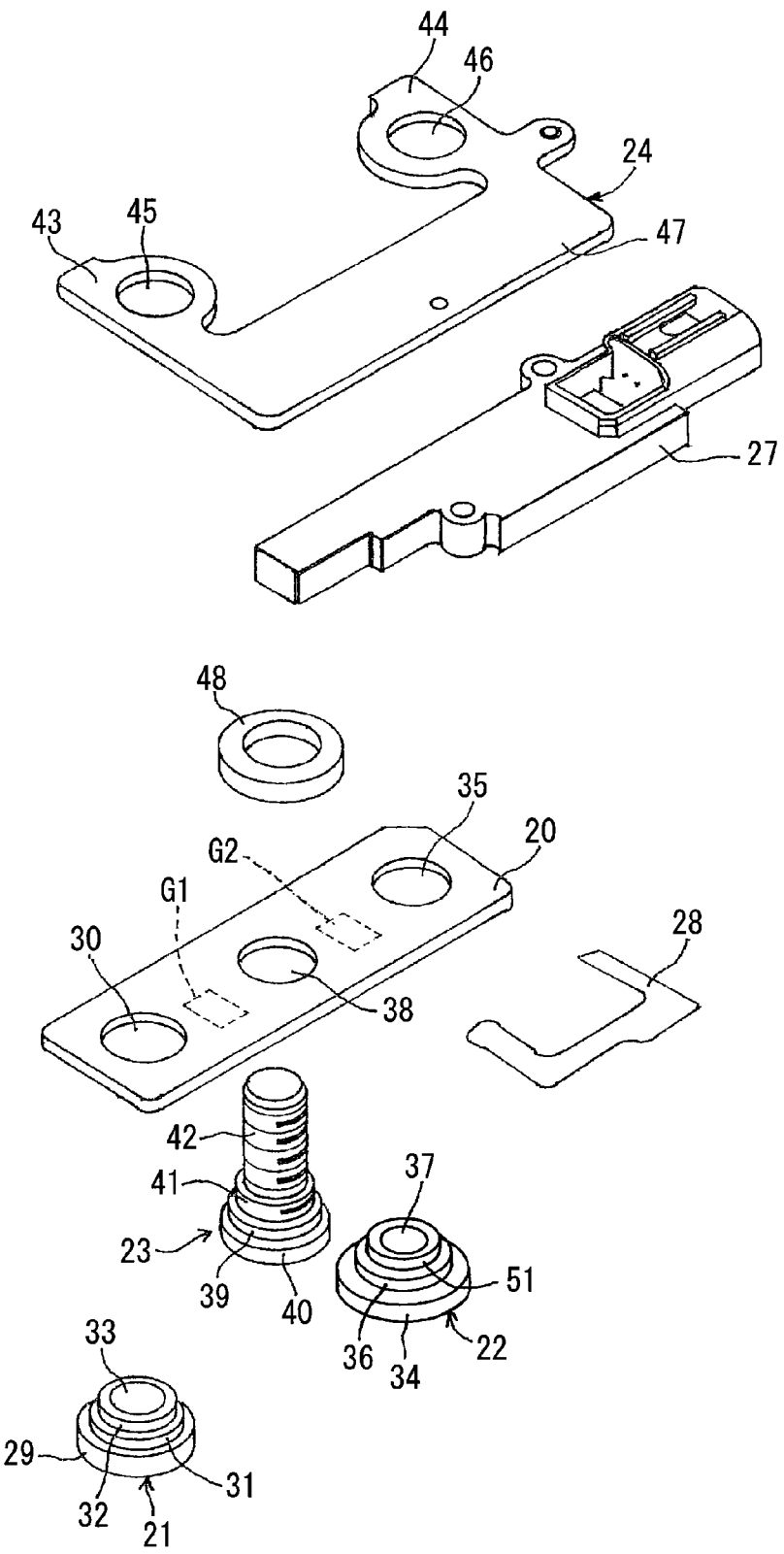
FIG. 3 is an exploded view of the load detection device.

As illustrated in FIGS. 2 and 3, the load detection device 10 includes, for example, a strain generating body 20 formed in a substantially rectangular plate-shape, strain gauges G1 and G2 attached on a surface of the strain generating body 20, a first lower bush 21 serving as a first fixing member for fixing the strain generating body 20 on the attachment surface 18 of the upper rail 16 at a first end portion of the strain generating body 20 in a lengthwise direction thereof, a second lower bush 22 serving as a second fixing member for fixing the strain generating body 20 on the attachment surface 18 of the upper rail 16 at a second end portion of the strain generating body 20 in the lengthwise direction thereof, a connecting shaft 23 serving as a connecting member, fixed at a substantially center portion of the strain generating body 20 in a vertical direction relative to the strain generating body 20 and then fixed at the seat frame 17 of the vehicle seat 11, an upper bracket 24 (an example of a bracket member) fixed on an upper surface of the strain generating body 20 at the first and second end portions of the strain generating body 20, an amplifier 27 arranged in substantially parallel to the strain generating body 20 at a lower surface of an connecting portion 47 of the upper bracket 24 and amplifying a signal outputted from the strain gauges G1 and G2, a flexible printed circuit board 28 (a FPC board 28) connected to each of the strain gauges G1 and G2 and to the amplifier 27. The strain generating body 20 is made from, for example, a plate member which is flexible and deformed when a load is applied thereto. A connector 59 connects a communication line for transmitting an output of the amplifier 27 to an electronic control unit.

Figure 5:
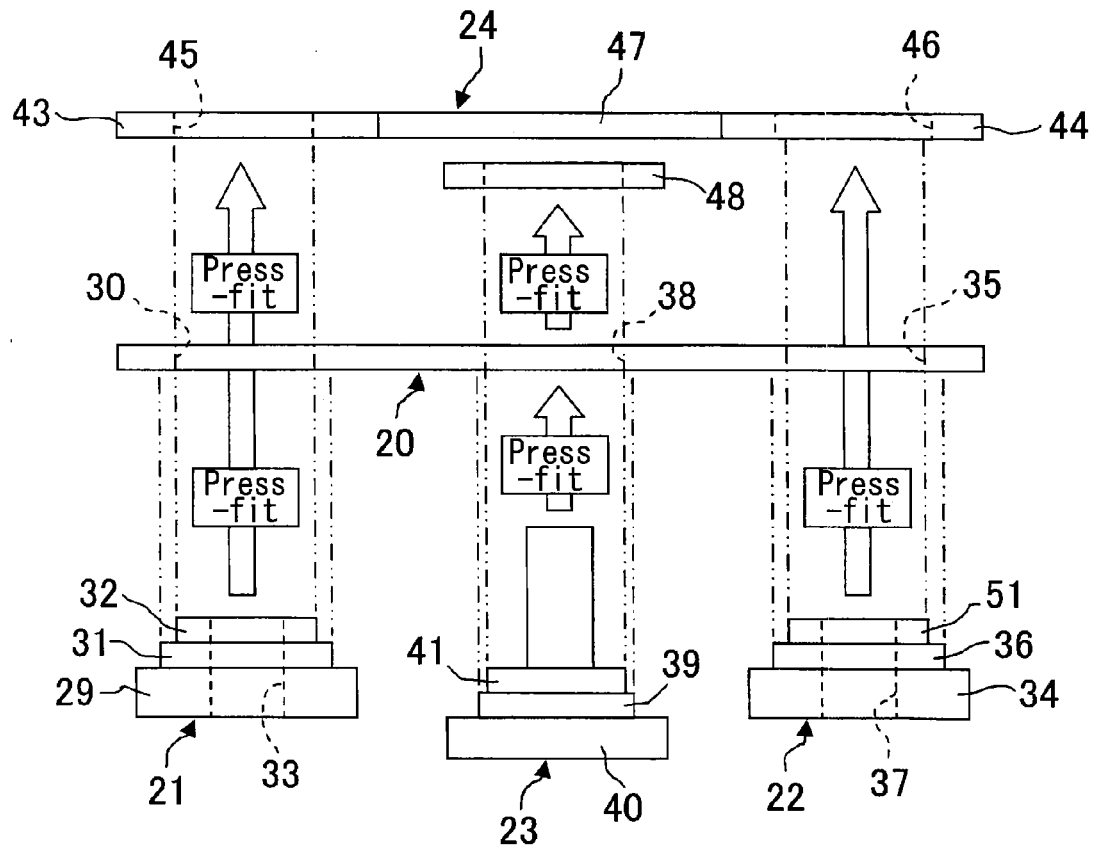
FIG. 5 is a view illustrating a process of assembling fixing members and the upper bracket on a strain generating body according to the embodiment.

As illustrated in FIG. 3 and FIG. 5, the second lower bush 22 is formed to have substantially the same shape as the first lower bush 21. Further, the first lower bush 21 includes a round-shaped base portion 29 having a predetermined thickness, a first middle shaft portion 31, which is provided on the base portion 29 so as to protrude in an axial direction thereof and which is press-fitted into a first end hole 30 provided at the first end portion of the strain generating body 20, a first end shaft portion 32 provided on the first middle shaft portion 31 so as to protrude in the axial direction thereof, and an attachment hole 33 passing through a center of the first lower bush 21 in the axial direction thereof. The second lower bush 22 includes a round-shaped base portion 34 having the predetermined thickness, a second middle shaft portion 36, which is provided on the base portion 34 so as to protrude in an axial direction thereof and which is press-fitted into a second end hole 35 provided at the second end portion of the strain generating body 20, a second end shaft portion 51 provided on the second middle shaft portion 36 so as to protrude in the axial direction thereof, and an attachment hole 37 passing through a center of the second lower bush 22 in the axial direction thereof.

The first end hole 30 and the second end hole 35 are provided at the first and second end portions of the strain generating body 20, respectively, so as to be spaced away from each other for the same predetermined distance as between the pair of fixing shafts 19. The first and second middle shaft portions 31 and 36 of the first and second lower bushes 21 and 22 are press-fitted into the first and the second end holes 30 and 35, respectively, until the base portions 29 and 34 of the respective first and second lower bushes 21 and 22 contact the lower surface of the strain generating body 20. A center hole 38 is formed at a substantially center portion of the strain generating body 20. A middle shaft portion 39 of the connecting shaft 23 is press-fitted into the center hole 38.

A flange 40 having a thickness thinner than the base portions 29 and 34 of the respective first and second lower bushes 21 and 22 is formed on one end portion of the connecting shaft 23. The flange 40 contacts the lower surface of the strain generating body 20 in a case where the connecting shaft 23 is press-fitted into the center hole 38 of the strain generating body 20. An end shaft portion 41 is provided on an end surface of the middle shaft portion 39 facing opposite from the flange 40 so as to extend in an axial direction of the connecting shaft 23. Further, a fixing threaded portion 42 is provided on one end surface of the end shaft portion 41 facing opposite from the middle shaft portion 39 so as to extend in the axial direction of the connecting shaft 23. The connecting shaft 23 is fixed on the strain generating body 20 so as to sandwich the strain generating body 20 with the flange 40 of the connecting shaft 23 and a ring member 48 in a manner where the middle shaft portion 39 of the connecting shaft 23 is press-fitted into the center hole 38 of the strain generating body 20 and then the ring member 48 is press-fitted onto the end shaft portion 41 of the connecting shaft 23.

Hence, in a case where the load acts on the strain generating body 20 via the connecting shaft 23, the strain generating body 20 is deformed while the first and second end portions thereof are supported by the first and the second lower bushes 21 and 22, respectively. When the strain generating body 20 is deformed, a strain is generated on the surfaces of the strain generating body 20 between the first lower bush 21 and the connecting shaft 23, and between the second lower bush 22 and the connecting shaft 23 in response to the load applied to the strain generating body 20. More specifically, when the strain generating body 20 is deformed, a compressive strain is generated on the surface of the strain generating body 20 towards the first and second lower bushes 21 and 22, that is, on a side of the second lower bushes 21 and 22, and a tensile strain is generated towards the connecting shaft 23, that is, on a side of the connecting shaft 23 in proportional to a level of the load applied to the strain generating body 20. In order to detect the compressive strain and the tensile strain, the strain gauges G1 and G2 are attached between the substantially center portion of the strain generating body 20 and the first lower bush 21, and between the substantially center portion of the strain generating body 20 and the second lower bush 22, respectively. In other words, the strain gauges G1 and G2 are attached between the connecting shaft 23 and the first lower bush 21, and between the connecting shaft 23 and the second lower bush 22, respectively.

A bridge circuit is formed by the strain gauges G1 and G2, so that an electrical signal is outputted in proportional to the load acting on the strain generating body 20. The strain generating body 20 is arranged so that the compressive strain is generated towards the first and second lower bushes 21 and 22, and the tensile strain is generated towards the connecting shaft 23. However, the strain generating body 20 may be modified so that the compressive strain or the tensile strain is generated only towards the first and second lower bushes 21 and 22, or so that the compressive strain or the tensile strain is generated only towards the connecting shaft 23.

The upper bracket 24, which serves as the bracket member, is fixed on the upper surface of the strain generating body 20 at the first and second end portions of the strain generating body 20 and at first and second fixing portions 43 and 44 of the upper bracket 24. In other words, the first and second fixing portions 43 and 44 are provided at end portions of the upper bracket 24, respectively. Further, the first and second fixing portions 43 and 44 are integrally connected by means of the connecting portion 47. The connecting portion 47 of the upper bracket 24 is arranged so as to extend along one side of the strain generating body 20, that is, so as to extend in the lengthwise direction of the strain generating body 20.

Figure 4:
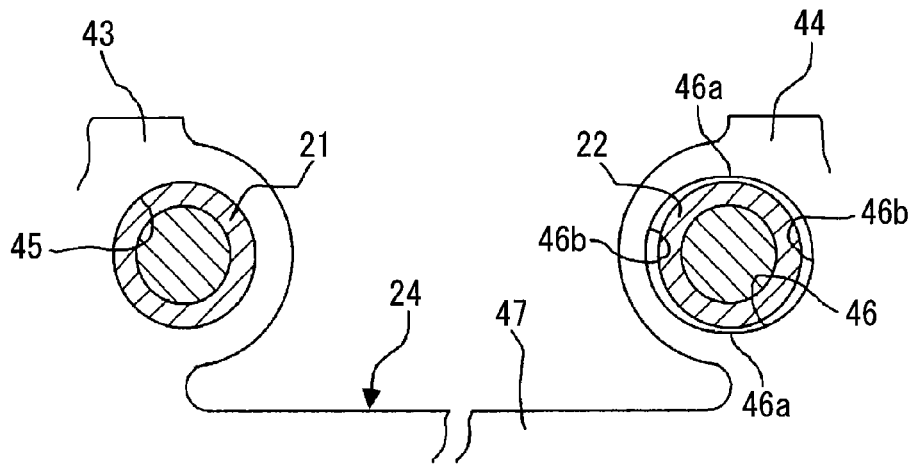
FIG. 4 is a plan view illustrating a fixing hole of each fixing portion of an upper bracket according to the embodiment.

The first end shaft portion 32 of the first lower bush 21 which protrudes from the upper surface of the strain generating body 20 is press-fitted into a first fixing hole 45 formed at the first fixing portion 43, thereby the first end portion of the strain generating body 20 is held between the first fixing portion 43 of the upper bracket 24 and the base portion 29 of the first lower bush 21. A second fixing hole 46 formed at the second fixing portion 44 corresponds to an elongated hole as shown in FIG. 4 and is fitted onto the second end shaft portion 51 of the second lower bush 22 which protrudes above the upper surface of the strain generating body 20 so that the second fixing hole 46 includes a degree of freedom of movement of the second fixing hole 46 of the upper bracket 24 in the lengthwise direction of the strain generating body 20 (that is, a direction connecting the first and second fixing holes 45 and 46 to each other) relative to the second end shaft portion 51 of the second lower bush 22, and at the same time so that movement of the second fixing hole 46 relative to the second end shaft portion 51 in a direction intersecting with the lengthwise direction of the strain generating body 20 is restricted.

More specifically, the second fixing hole 46 formed at the second fixing portion 44 is constituted by an elongated hole including an elliptic shape or a long hole formed by width-across-flat portions 46a each provided in a lengthwise direction of the upper bracket 24, and circular arc portions 46b each connected to corresponding end portions of the width-across-flat portions 46a. The second fixing hole 46 includes a relatively large clearance in the lengthwise direction of the upper bracket 24 relative to the second end shaft portion 51 of the second lower bush 22 and a minor clearance, which serves as a clearance, restricting the movement of the second fixing hole 46 of the upper bracket 24 relative to the second end shaft portion 51 of the second lower bush 22 in the direction intersecting with the lengthwise direction, and is fitted (that is, loosely fitted) onto the second end shaft portion 51. The second fixing hole 46 at the second fixing portion 44 may be formed so as to be fitted onto the second end shaft portion 51 of the second lower bush 22 without the clearance therebetween but so as not to be press-fitted thereon.

According to the above-described structure, the second fixing hole 46 constituted by the elongated hole is formed at the second fixing portion 44, which corresponds to a side where the connector 59 of the amplifier 27 is arranged, however, the elongated hole may be formed at the first fixing portion 43 positioned at a side opposite to the connector 59.

According to the above-described structure, even in a case where the first and second fixing portions 43 and 44 of the upper bracket 24 are connected to each other by means of the connecting portion 47, and even in a case where a pitch between the first and second lower bushes 21 and 22 (that is, a pitch between the first end hole 30 and the second end hole 35 of the strain generating body 20) does not correspond to a pitch between the first fixing hole 45 and the second fixing hole 46, which are integrally connected to each other by means of the connecting portion 47, of the upper bracket 24 due to, for example, a dimensional error, an internal stress is not applied to the strain generating body 20. In addition, because the movement of the second fixing hole 46 of the upper bracket 24 relative to the second end shaft portion 51 of the second lower bush 22 in the direction intersecting with the lengthwise direction of the strain generating body 20 is restricted, all portions of the load detection device 10 remain in point symmetrical with respect to a load center (a center of the connecting shaft 23), and thus a high detection accuracy is ensured.

As illustrated in FIG. 7, a connecting surface 62 is formed so as to face the attachment surface 18 of each of the upper rail 16 in an up-and-down direction. The connecting surface 62 is arranged at each of the left and right sides of the seat frame 17 of the vehicle seat 11. A connecting hole 63, through which the connecting shaft 23 of the load detection device 10 is inserted, and insertion holes 64, through which fastening nuts 60 are inserted respectively, are formed on the connecting surface 62. The connecting hole 63 is located between the insertion holes 64 and 64.

Figure 6:
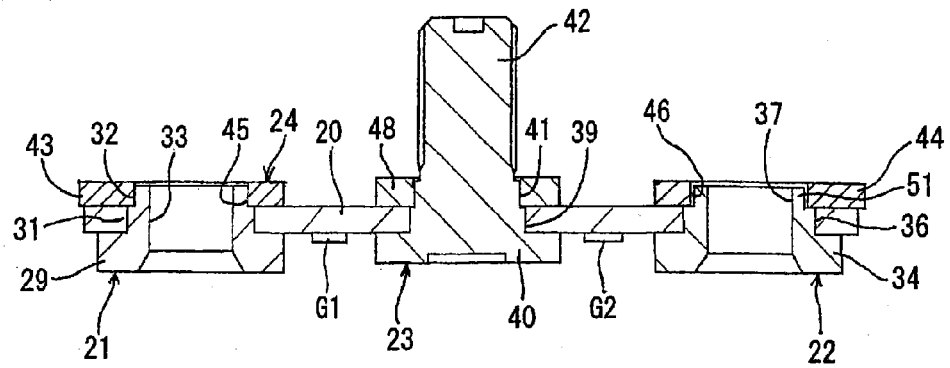
FIG. 6 is a state where the load detection device of the embodiment is assembled.

The load detection device 10 is assembled at a component manufacturer or at a component factory to be in an assembled state as illustrated in FIGS. 2 and 6, and then is transported to a vehicle manufacturer or to a vehicle assembly factory in the assembled state. At this time, the second fixing portion 44 of the upper bracket 24 is not in a coupled or connected state relative to the second lower bush 22 press-fitted into the second end hole 35 of the strain generating body 20, however, the first fixing portion 43 of the upper bracket 24 is press-fitted onto the first end shaft portion 32 of the first lower bush 21. Accordingly, there is little concern that part of the parts or components of the load detection device 10 comes off and falls out during the transportation of the load detection device 10.

A procedure for mounting the load detection device 10, which is assembled at the component manufacturer or at the component factory, on each of the pair of upper rails 16 of the seat slide apparatus 13 and on the seat frame 17 of the vehicle seat 11 under each of four corners of a lower surface of the vehicle seat 11 so as to be positioned between the pair of upper rails 16 and the seat frame 17 will be described below.

Each of the load detection devices 10 is arranged in a manner where: the strain generating body 20 is interposed between the attachment surface 18 of the upper rail 16 and the connecting surface 62 of the seat frame 17; the amplifier 27 is arranged at an inner side portion of the upper rail 16, that is, at a position inwardly offset in the left-right direction of the vehicle seat 11 from a position where the attachment surface 18 of the upper rail 16 and the connecting surface 62 of the seat frame 17 oppose each other; and the connector 59 is arranged so as to face the electronic control unit fixed on the floor 12 under substantially a center portion of the vehicle seat 11 so that the connector 59 faces to the other connector 59 arranged on the same attachment surface 18 of the upper rail 16 under the other corner of the lower surface of the vehicle seat 11 in the front-rear direction of the vehicle.

Four of the load detection devices 10 are attached between the pair of upper rails 16 and the seat frame 17 in the similar manner. Therefore, the attachment of the load detection devices 10 will be explained with one of the four load detection devices 10 as an example. However, the arrangement of the amplifiers 27 relative to the corresponding strain generating bodies 20 differ from each other in the left-right direction and in the front-rear direction of the vehicle seat 11. More specifically, each of the amplifiers 27 is arranged at the inner side in the left-right direction of the vehicle seat 11 relative to each of the strain generating bodies 20, which is arranged between the attachment surface 18 of the upper rail 16 and the connecting surface 62 of the seat frame 17. Further, each of the connectors 59 is arranged so as to face the other connector 59, provided at the same upper rail 16, relative to each of the amplifiers 27 in the front-rear direction of the vehicle seat 11. Accordingly, the load detection devices 10 having the same arrangement are provided at the front-left side and the rear-right side of the vehicle seat 11, respectively, and the load detection devices 10 having the same arrangement are provided at the front-right side and the rear-left side of the vehicle seat 11, respectively. Hence, the load detection devices 10 having the same structure are arranged in two different ways on the upper rails 16. That is, two types of the load detection devices 10 each type having the different structure from each other constitute the four of the load detection devices 10 of the embodiment which are used for the vehicle seat.

The attachment hole 33 of the first lower bush 21 and the attachment hole 37 of the second lower bush 22 are fitted onto the fixing shafts 19 provided on each end portion of each of the upper rails 16 so as to extend in the vertical direction, and bottom surfaces of the respective base portions 29 and 34 are placed on the attachment surface 18. The fastening nuts 60, each screwed onto a threaded portion of the corresponding fixing shafts 19, press the first and second fixing portions 43 and 44 of the upper bracket 24. As a result, the strain generating body 20 of the load detection device 10 is fixed on the attachment surface 18 of the upper rail 16 at the first and second end portions of the strain generating body 20.

At this time, a contact area between a bearing surface of the fastening nut 60 pressing the first fixing portion 43 of the upper bracket 24 and the upper bracket 24 is different from a contact area between a bearing surface of the fastening nut 60 pressing the second fixing portion 44 of the upper bracket 24 and the upper bracket 24 because the second fixing hole 46 formed at the second fixing portion 44 corresponds to the elongated hole. The aforementioned difference in the contact areas has a slight effect on the detection accuracy.

Figure 8:
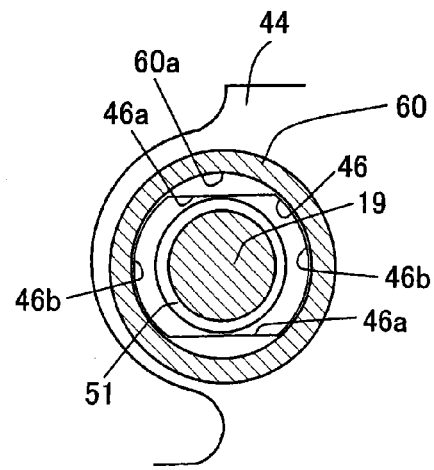
FIG. 8 is an enlarged view viewed from a direction of the arrow along line VIII-VIII in FIG. 7.
Figure 9:
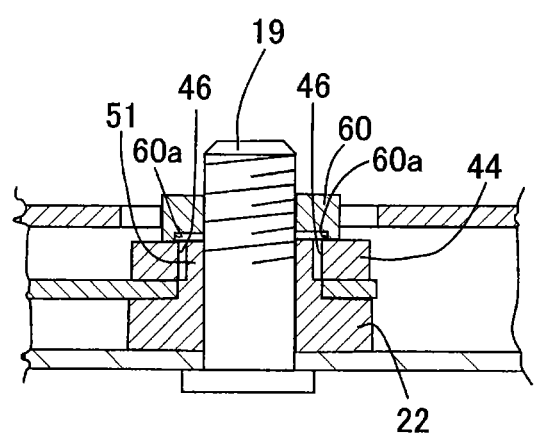
FIG. 9 is an enlarged partial view of the right end portion of FIG. 7.

According to the embodiment, as illustrated in FIGS. 8 and 9, the bearing surface of each of the fastening nuts 60 is formed so that an inner diameter of a screw hole of a bearing surface opening end 60a of each of the fastening nuts 60 fastening the respective first and second fixing portions 43 and 44 is larger than a dimension of a major diameter of the second fixing hole 46 (the elongated hole) formed at the second fixing portion 44. Thus, the area of contact at which each fastening nut 60 is in contact with the upper bracket 24 is set to be identical to each other between the first and second fixing portions 43 and 44 so that contact pressure is identical to each other between the end portions of the upper bracket 24. Accordingly, the high detection accuracy is ensured.

The connecting surface 62 having the connecting holes 63 is formed on the seat frame 17 of the vehicle seat 11. The fixing threaded portion 42 of each connecting shaft 23 is fitted into the corresponding connecting hole 63. Accordingly, a lower surface of the connecting surface 62 contacts an upper surface of each of the ring members 48, and the seat frame 17 is set on the upper rails 16 via the strain generating bodies 20, the first and second lower bushes 21 and 22. Then, the connecting surface 62 is fixed on the ring members 48 in a manner that the connecting surface 62 is pressed against the ring members 48, by means of the fastening nuts 65 screwed onto the respective fixing threaded portions 42. As a result, the connecting shaft 23 of each of the load detection devices 10 is fixed on the seat frame 17 of the vehicle seat 11.

In the seat apparatus for the vehicle including the load detection devices 10 each having the above-described structure, when the occupant is seated on the seat cushion, the load applied by the occupant acts on the strain generating bodies 20 via the connecting shafts 23.

As a result, the substantially center portion of each of the strain generating bodies 20, whose first and second end portions are respectively supported by the first and second lower bushes 21 and 22, is deformed. When each strain generating body 20 is deformed, the strain is generated on the surface of the strain generating body 20 between the first lower bush 21 and the connecting shaft 23, and between the second lower bush 22 and the connecting shaft 23 in proportional to the load applied to the strain generating body 20. More specifically, when the strain generating body 20 is deformed, the compressive strain is generated on the surface of the strain generating body 20 towards the first and second lower bushes 21 and 22 and the tensile strain is generated towards the connecting shaft 23 in proportional to the load applied to the strain generating body 20. The compressive strain and the tensile strain are detected by the strain gauges G1 and G2 attached on each of the strain generating bodies 20. Detection outputs of the strain gauges G1 and G2 are amplified by the amplifier 27, and the output of the amplifier 27 is transmitted to the electronic control unit via the communication line connected to the connector 59.

Accordingly, the load applied by the occupant seated on the vehicle seat 11 is detected on the basis of the strain generated on the strain generating bodies 20. Moreover, an airbag and the like is appropriately controlled in response to the weight of the occupant on the basis of the load detection result.

According to the aforementioned embodiment, each load detection device 10 includes the upper bracket 24 which has the first and second fixing portions 43 and 44 connected to each other via the connecting portion 47, the first fixing hole 45 formed on the first fixing portion 43 and press-fitted onto the first end shaft portion 32 of the first lower bush 21, and the second fixing hole 46 formed on the second fixing portion 44 and fitted onto the second end shaft portion 51 of the second lower bush 22 so that the second fixing hole 46 includes the degree of freedom of the movement thereof relative to the second end shaft portion 51 of the second lower bush 22 in the lengthwise direction of the strain generating body 20, and at the same time so that the movement of the second fixing hole 46 of the upper bracket 24 relative to the second end shaft portion 51 of the second lower bush 22 in the direction intersecting with the lengthwise direction of the strain generating body 20 is restricted.

Therefore, even in a case where the first and second fixing portions 43 and 44 are integrally connected to each other by means of the connecting portion 47, for example, the dimensional error is absorbed between the upper bracket 24 and the second lower bush 22, and thus the internal stress is unlikely to act on the strain generating body 20 from, for example, the first and second lower bushes 21 and 22 via the upper bracket 24.

Further, because the second fixing portion 44 of the upper bracket 24 is restricted from moving in the direction intersecting with the lengthwise direction relative to the second end shaft portion 51 of the second lower bush 22, all the portions of the load detection device 10 remain in point symmetrical with respect to the load center (the center of the connecting shaft 23), and thus the high detection accuracy is ensured.

Further, a known washer, which is press-fitted onto the second lower bush in a known load detection device, is not used in the load detection device 10 of the embodiment. Thus, the number of parts and weight of the load detection device 10 are reduced. Accordingly, an assembling work load, and thus costs may be reduced. In addition, a concern that a fastening axial force becomes unstable due to the known washer that is additionally attached, which results in reduction in the load detection ability, is eliminated.

According to the aforementioned embodiment, by interposing the load detection devices 10 between the seat frame 17 (the seat-side fixing member) fixing the vehicle seat 11 and the upper rails 16 (the floor-side fixing member) fixing the seat frame 17 on the floor 12 of the vehicle, the load applied by the occupant is accurately detected.

According to the aforementioned embodiment, the amplifier 27 is attached to the connecting portion 47, which integrally connects the first and second fixing portions 43 and 44 of the upper bracket 24 to each other. However, the connecting portion 47 is provided not only for attaching the amplifier 27 thereon. The connecting portion 47 has advantages of reducing the number of components for forming the upper bracket 24.

According to the aforementioned embodiment, the first and second lower bushes 21 and 22 are fixed on the upper rails 16 (the floor-side fixing member), and the connecting shaft 23 is fixed on the seat frame 17 (the seat-side fixing member). However, each load detection device 10 of the embodiment may be modified so that the first and second lower bushes 21 and 22 are fixed on the seat frame 17, and the connecting shaft 23 is fixed on the upper rail 16.

According to the aforementioned embodiment, the second fixing hole 46 is formed to be the elongated hole including the elliptic shape, however, the elongated hole is not limited thereto. The elongated hole may include, for example, a polygonal shape or a splined configuration as long as the elongated hole includes the degree of freedom of the movement of the second fixing hole 46 of the upper bracket 24 in the lengthwise direction of the strain generating body 20 and restricts the movement thereof in the direction intersecting with the lengthwise direction.

This disclosure is not limited to the aforementioned embodiment and may be appropriately changed or modified without departing from a subject matter of this disclosure.

The load detection device for the vehicle seat is configured to be interposed between the seat frame and the upper rails, and to be used for the seat for the vehicle where the load of the occupant seated on the seat is detected.

According to the aforementioned embodiment, the load detection device 10 for the vehicle seat includes the strain generating body 20 including the first end hole 30 at the first end portion of the strain generating body 20 and the second end hole 35 at the second end portion of the strain generating body 20, and the strain gauges G1 and G2 being attached on the strain generating body 20 between the first end hole 30 and the second end hole 35, the first lower bush 21 including the first middle shaft portion 31 press-fitted into the first end hole 30 and the first end shaft portion 32 protruding from the first middle shaft portion 31, the first lower bush 21 is configured to be connected to one of the seat frame 17 fixing the vehicle seat, and the upper rails 16 fixing the seat frame 17 to the floor 12 of the vehicle, the second lower bush 22 including the second middle shaft portion 36 press-fitted into the second end hole 35 and the second end shaft portion 51 protruding from the second middle shaft portion 36, the second lower bush 22 is configured to be connected to the one of the seat frame 17 and the upper rails 16, the upper bracket 24 including the connecting portion 47 and the first and second fixing portions 43 and 44 connected to each other with the connecting portion 47, the upper bracket 24 including the first fixing hole 45 at one of the first and second fixing portions 43 and 44 and the second fixing hole 46 at the other one of the first and second fixing portions 43 and 44, the first fixing hole 45 being formed in a manner that the first end shaft portion 32 of the first lower bush 21 is configured to be press-fitted into the first fixing hole 45, the second fixing hole 46 being formed to be fitted onto the second end shaft portion 51 of the second lower bush 22 in a manner that the second fixing hole 46 includes the degree of freedom of the movement of the second fixing hole 46 relative to the second end shaft portion 51 of the second lower bush 22 in the lengthwise direction of the strain generating body 20 and in a manner that a movement of the second fixing hole 46 relative to the second end shaft portion 51 in the direction intersecting with the lengthwise direction is restricted, and the connecting shaft 23 integrally connected to the center portion of the strain generating body 20 and connected to the other one of the seat frame 17 and the upper rails 16.

According to the above described structure, the load detection device 10 includes the upper bracket 24 including the first and second fixing portions 43 and 44 connected to each other by means of the connecting portion 47, the first fixing hole 45 formed at the first fixing portion 43 is press-fitted onto the first end shaft portion 32 of the first lower bush 21 and the second fixing hole 46 formed at the second fixing portion 44 includes the degree of freedom of the movement of the second fixing hole 46 relative to the second end shaft portion 51 of the second lower bush 22 in the lengthwise direction of the strain generating body 20 and the movement of the second fixing hole 4 in the direction intersecting with the lengthwise direction of the strain generating body 20 is restricted. Thus, even in a case where the first and second fixing portions 43 and 44 are connected to each other by means of the connecting portion 47, for example, the dimensional error is absorbed between the upper bracket 24 and the second lower bush 22. Accordingly, it is unlikely that the internal stress acts from the first and second lower bushes 21 and 22 to the strain generating body 20 via the upper bracket 24. Consequently, according to the embodiment, the load detection ability is ensured.

According to the aforementioned embodiment, the second fixing hole 46 is constituted by the elongated hole including the width-across-flat portions 46a each extending in the lengthwise direction of the strain generating body 20.

According to the above described structure, the second fixing hole 46 is formed easily. In addition, even in a case where the second fixing hole 46 is displaced relative to the second end shaft portion 51 of the second lower bush 22 in the lengthwise direction, it is securely restricted that the internal stress from acting on the strain generating body 20.

According to the aforementioned embodiment, the second fixing hole 46 is fitted onto the second end shaft portion 51 of the second lower bush 22 with the minor clearance therebetween, the minor clearance restricts the movement of the second fixing hole 46 relative to the second end shaft portion 51 in the direction intersecting with the lengthwise direction of the strain generating body 20.

According to the above described structure, the second end shaft portion 51 of the second lower bush 22, which is fitted into the second fixing hole 46, is not brought in a press-fitted state even by, for example, the dimensional error of the second end shaft portion 51 of the second lower bush 22 and/or the second fixing hole 46. Accordingly, a relationship between the second end shaft portion 51 of the second lower bush 22 and the second fixing hole 46 remains constant.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A load detection device for a vehicle seat, comprising:
a strain generating body including a first end hole at a first end portion of the strain generating body and a second end hole at a second end portion of the strain generating body, and a strain gauge being attached on the strain generating body between the first end hole and the second end hole;
a first fixing member including a first middle shaft portion press-fitted into the first end hole and a first end shaft portion protruding from the first middle shaft portion, the first fixing member being configured to be connected to one of a seat-side fixing member fixing the vehicle seat and a floor-side fixing member fixing the seat-side fixing member to a floor of the vehicle;
a second fixing member including a second middle shaft portion press-fitted into the second end hole and a second end shaft portion protruding from the second middle shaft portion, the second fixing member being configured to be connected to the one of the seat-side fixing member and the floor-side fixing member;
a bracket member including a connecting portion and first and second fixing portions connected to each other with the connecting portion, the bracket member including a first fixing hole at one of the first and second fixing portions and a second fixing hole at the other one of the first and second fixing portions, the first fixing hole being formed in a manner that the first end shaft portion of the first fixing member is configured to be press-fitted into the first fixing hole, the second fixing hole being formed to be fitted onto the second end shaft portion of the second fixing member in a manner that the second fixing hole includes a degree of freedom of a movement of the second fixing hole relative to the second end shaft portion of the second fixing member in a lengthwise direction of the strain generating body and in a manner that a movement of the second fixing hole relative to the second end shaft portion in a direction intersecting with the lengthwise direction is restricted;
a connecting member integrally connected to a center portion of the strain generating body and connected to the other one of the seat-side fixing member and the floor-side fixing member; and
fastening nuts each of which is formed to include an outside dimension that is larger than a diameter dimension of the second fixing hole along a lengthwise direction thereof and which are used for fastening directly to the first and second fixing portions, respectively,
wherein the second fixing member is fitted to the second end shaft portion of the second fixing hole in a manner that the second fixing hole is restricted from moving relative to the second end shaft portion of the second fixing member in the direction which intersects, on a surface to which the strain gauge is attached, with the lengthwise direction of the strain generating body, and in a manner that the other one of the first and second fixing portions, at which the second fixing hole is formed, is restricted from moving relative to the second end shaft portion of the second fixing member in an insertion direction of the second fixing member,
wherein the second fixing hole is fitted onto the second end shaft portion of the second fixing member with a clearance therebetween, the clearance encircles the entire second end shaft portion, and the clearance hole reduces the movement of the second fixing hole relative to the second end shaft portion in the direction intersecting with the lengthwise direction of the strain generating body, and
wherein the fastening nut is formed so that an inner diameter of a screw hole of a bearing surface opening end of each of the fastening nuts is larger than a diameter dimension of the second fixing hole along a lengthwise direction.

2. The load detection device according to claim 1, wherein the second fixing hole is constituted by an elongated hole including a width-across-flat portion extending in the lengthwise direction of the strain generating body.

3. The load detection device according to claim 1,
wherein each of the fastening nuts includes a bearing surface which is formed so that an area of contact at which the bearing surface of the fastening nut fastening the other one of the first and second fixing portions, at which the second fixing hole is formed, is in contact with the bracket member is equal to an area of contact at which the bearing surface of the fastening nut fastening the one of the first and second fixing portions, at which the first fixing hole is formed, is in contact with the bracket member.

4. The load detection device according to claim 2,
wherein each of the fastening nuts includes a bearing surface which is formed so that an area of contact at which the bearing surface of the fastening nut fastening the other one of the first and second fixing portions, at which the second fixing hole is formed, is in contact with the bracket member is equal to an area of contact at which the bearing surface of the fastening nut fastening the one of the first and second fixing portions, at which the first fixing hole is formed, is in contact with the bracket member.

5. The load detection device according to claim 2, wherein the second fixing hole includes circular arc portions each connected to corresponding end portions of the width-across-flat portions.

6. The load detection device according to claim 1, wherein the clearance is larger in the lengthwise direction of the upper bracket than the clearance is in the direction that intersects the lengthwise direction.

* * * * *